United States Patent
Meyer

[15] 3,697,493
[45] Oct. 10, 1972

[54] PREPARATION OF POLYVINYLCHLORIDE

[72] Inventor: Günther Meyer, Sieglas Augustinusstr., Germany

[73] Assignee: Dynamit Nobel Aktiengesellschaft, Troisdorf, Germany

[22] Filed: March 27, 1969

[21] Appl. No.: 811,208

[30] Foreign Application Priority Data

March 30, 1968 Germany..........P 17 70 094.6

[52] U.S. Cl. ..........260/85.5 XA, 260/86.3, 260/87.1, 260/87.5 R, 260/87.5 G, 260/87.7, 260/92.8 W
[51] Int. Cl. ..........C08f 1/11, C08f 3/30, C08f 15/02
[58] Field of Search...260/92.8, 87.5, 85.5 XA, 86.3, 260/87.1, 87.7

[56] References Cited

UNITED STATES PATENTS 3,370,105  2/1968  DeBell et al. ..............260/880
3,436,440  4/1969  Abe et al. ..................260/880

FOREIGN PATENTS OR APPLICATIONS 1,087,390  10/1967  Great Britain.......260/92.8 W

*Primary Examiner*—Joseph L. Schofer
*Assistant Examiner*—John A. Donohue, Jr.
*Attorney*—Burgess, Dinklage & Sprung

[57] ABSTRACT

Process for preparing an improved polyvinyl chloride comprising polymerizing vinyl chloride in the presence of a peroxide and/or azo compound as catalyst, a protective colloid and in the additional presence of 1 to 20 weight percent referred to the vinylchloride of a polyvinylchloride including an emulsifier, the polyvinyl chloride having a particle size of 0.03 to 2.0 $\mu$, introducing a salt of a bivalent or trivalent metal to precipitate the emulsifier which has been introduced with the polyvinylchloride emulsion, and recovering the polyvinylchloride product of improved properties thereby formed.

9 Claims, No Drawings

PREPARATION OF POLYVINYLCHLORIDE

This invention relates to a process for preparing improved polyvinylchloride.

More particularly this invention relates to a process for preparing polyvinylchloride characterized by properties which allow for satisfactory working and suitability for most applications.

It is in the prior art to polymerize vinyl chloride using the suspension method. Organic catalysts are used in these processes, for example, peroxides or azo compounds and protective colloids, such as gelatins, methyl cellulose or even polyvinyl alcohols, are also used in this connection.

The suspension polymers prepared on the basis of the prior art procedures, however, are not of such a quality as to satisfy most production and application engineers. A more or less wide particle size distribution is obtained, i.e., 30 to 300 microns having a non-uniform particle structure ranging from transparent, dense particles to porous granules of varying diameter. Numerous efforts have been made to arrive at a more regular and more readily processable particle material by varying the polymerization conditions. The proposals so far have failed to solve the so-called "Stippen" problem (speck formation), i.e., the unexpected occurrence of inhomogeneities in the final products.

In order that the problem of speck formation be kept at a minimum, the manufacturer requires polymer materials, i.e., particles, that can be worked up uniformly, but this requirement has not as yet been completely complied with.

The actual cause for the formation of specks has not previously been determined. However, the following may be considered as constituting requirements which must be satisfied if speck formation is to be eliminated:
a. the formation of uniform PVC particles having a narrow range of particle size, and
b. the prevention of cross-linking reactions with the protective colloid.

In the processes of the prior art, a ratio of water to vinylchloride of substantially 2 to 1 has been used.

The quantity of protective colloid amounts to between 0.1 and 0.5 percent and that of the catalyst to from 0.05 to 1 percent based on the quantity of the monomer. On the basis of these formulations, the particle structures and particle-size distributions described above are obtained, but they are not uniform. A particular particle form is obtained according to British Patent 796,309, which additionally uses emulsifiers of the alkyl sulfonate or aryl alkyl sulfonate type in the form of their calcium and magnesium salts, respectively. A similar procedure is followed in the process described in German Green Patent 1,236,783, which uses polyamines in place of the alkyl sulfonates. A disadvantage of these procedures is that water-soluble emulsifier additives suppress the action of the protective colloid system in suspension polymerization and produce more or less shapeless or broken particles having a porous structure. These disadvantages are obviated according to the above-cited British patent by forming difficulty soluble alkaline-earth salts from the water-soluble emulsifiers. The interaction of these salts with the protective colloid results in a PVC having an especially loose and porous structure. The plasticizer absorption, as determined by the oil-spot method amounts to about 38 percent for a product of this type.

The particle size distribution of such products, however, is still unsatisfactory, and varies greatly according to the type of autoclave used and the nature of the stirring during the polymerization. In addition to the polymer recovered in usable particle sizes, very fine particles are also present which particles have an adverse effect on the free-flowing quality of the PVC powder. If a more uniform processability is to be achieved, it is necessary in this case to classify, i.e., grade or screen the polymer powder. Furthermore, the bulk weight, which is important with regard to the subsequent plastification in extruders, is too low, i.e., the bulk weight amounts to less than 0.4.

Attempts have also been made to improve the plasticizability of polyvinylchloride polymers in the processing procedures by, for example, modifying the stirring conditions in the polymerization and increasing the protective colloid content. There has thereby been obtained a very fine but dense particle material. The plasticizer absorption of this type of particles is, however, poor, amounting to less than 15 percent.

All of the aforesaid and remaining known methods produce PVC powders which contain specks, the same having been caused by the wide range of grain sizes and/or by cross-linking in the particles.

In accordance with the invention it has now been found that suspension polymers having a narrow range of particle sizes, good dry-blend structure and uniform particle shapes can be made by carrying out the polymerization in the presence of 1 to 20 percent and and preferably 3 to 8 percent referred to the weight of the monomer, of a polyvinylchloride emulsion containing an emulsifier, preferably in the form of a latex having a particle size of 0.03 to 2.0 microns, preferably 0.3 to 0.5 microns, and thereafter precipitating the emulsifier introduced in the emulsion polyvinyl chloride emulsion by the addition of salts of bivalent or trivalent metals thereto.

The process is carried out in the following manner:

A fully polymerized emulsion PVC latex is introduced into an agitator autoclave in addition to water, a protective colloid and a catalyst. The emulsifier that is introduced with the latex is made insoluble by the introduction of bivalent or polyvalent metal cations, i.e., bivalent and/or polyvalent metal salts. Following the evacuation of the reaction vessel, gaseous vinyl chloride monomer is injected into the vessel and polymerized therein at the desired temperature.

The speed of the stirring and the shape of the autoclave can be varied greatly without affecting the dry-blend structure, particle structure and narrow particle size distribution of the polymer product.

Surprisingly, a polymer of uniform particle shape is obtained, in which the particle sizes fall within a very narrow range, and having a dry-blend structure which is good, i.e., the particles have a uniform and high porosity. Any particle size selected, from about 50 to 200 microns, can be obtained as desired, although it can be made larger or smaller by varying, for example, the protective colloid content of the emulsion or the stirring speed. About 90 percent of the particles of the product will fall within a range of sizes which varies only by about 20 to no more than 50 microns. Microscopic examination of the polymer particles shows that the particles have a substantially uniform size and uniform shape. It is also noted that clumping of particles does not take place.

The plasticizer absorption of the particles, on the basis of the oil-spot test method, using dioctyl phthalate as the testing agent, amounts to between 30 and 50 percent, all of the particles uniformly absorbing the plasticizer.

The completion of the polymerization is indicated by the drop in the pressure in the autoclave. At this time the yield of polymer amounts to 90 to 95 percent.

The emulsion PVC should be in the form of a latex having a solids content of between 20 and 60 percent by weight. The particle sizes of the emulsion PVC ranges from 0.03 to 2.0 microns, but should be concentrated mainly within a narrow range. Alternatively, the emulsion PVC may be in the form of a solid product which has been prepared from such a latex by careful drying, for example, by spray drying, the particle aggregate size of which then ranges from 5 to 10 microns. When the latter dried PVC powders are used, a larger quantity is needed, amounting generally to from two to three times the solid content of latices. The K value of the emulsion PVC is generally the same as that of the suspension PVC that is being prepared.

The catalysts for the polymerization can be peroxides or azo compounds which are soluble in monomers, such as for example, lauroyl, caproyl or benzoyl peroxides or other acid peroxides, ketoperoxides, persulfates or azoisobutyric acid nitrile.

Methyl cellulose, gelatins, water-soluble starches, polyvinyl alcohols, polyacrylic acid, or the like can be used as protective colloids as can finely divided inorganic substances such as talc or kaolin.

In accordance with the process of the invention it is also possible to obtain copolymers having a dry-blend structure. As comonomers there can be used vinyl compounds, such as vinyl acetate, vinylidene chloride, vinyl ether, acrylonitrile, or acrylic or methacrylic acid esters, in quantities of up to 10 percent of the weight of the monomer mixture.

The salts of bivalent or trivalent metals which can be introduced for precipitating the emulsifiers include chlorides, sulfates, nitrates and acetates, of calcium, magnesium, aluminum, strontium, barium, tin or zinc.

The polymerization temperature to be used should fall within the conventional range for suspension polymerizations, namely between 30° and 80°C, although the polymerization can also be carried out at lower temperatures, with the addition of antifreeze agents, i.e., at temperatures below 0°C.

By lowering the polymerization temperature, of course, the K value of the resultant products is increased. Products made by the method of the invention and having K values of 70 and more have a high porosity (pore volume as high as 50 percent). Their absorption of plasticizer is also high, i.e., values of between 40 and 45 percent; whereas products having a K value of 60 have a plasticizer absorption of about 35 percent.

The products which have a low K value (see Examples 1–3), however, are of particular technical importance because in spite of their high bulk density they have a high plasticizer absorption for a product of this K-value range.

The K value can be influenced not only by varying the polymerization temperature, but also by the use of regulators. Alcohols, ketones, ethers, etc., and chlorinated hydrocarbons such as chloroform or dichloroethylene, when used in quantities of 0.5 to 3 percent of the quantity of the monomers, reduce the K value by about two to 10 units.

The following examples are given for the purpose of illustrating the invention and are not to be construed as limiting the same in any way. In the examples the quantities are given in parts by weight or percentages by weight. The bulk densities are defined in kilograms per liter, and the particle sizes in microns equal to 0.001 mm.

EXAMPLE 1

The following components were introduced into a 160 liter autoclave:

| | |
|---|---|
| 90 | parts of desalted water, |
| 0.1 | part methyl cellulose, |
| 4.5 | parts emulsion PVC latex (K value 60, solid content 40%, average particle size 0.4 $\mu$), |
| 0.1 | parts calcium chloride, and |
| 0.09 | parts lauroyl peroxide. |

After the autoclave had been evacuated, 45 parts of vinyl chloride were introduced. The resulting suspension was heated to 63°C with stirring (180 rpm). After 7.5 hours a pressure drop took place. At a residual pressure of 3 kg/cm², the autoclave was depressurized and cooled. 41 parts of PVC were obtained having particle sizes ranging between 100 and 150 $\mu$. The polymer material had a very good plasticizer absorption (32 percent according to the oil-spot method described supra). The K value of the polymer amounted to 60. When it was further worked into blown sheets, substantially no specks appeared in the sheets. Sheets can be prepared from the products in accordance with the invention having a thickness of 15 to 30 microns without the occurrence of any problems as for example the tearing of the sheet due to the presence of specks.

When 0.2 parts of aluminum sulfate were used in place of the calcium chloride, similar results were obtained. The same is also true when the same quantity of benzoyl peroxide was used instead of lauroyl peroxide.

EXAMPLE 2

Example 1 was repeated but using instead of emulsion PVC latex, 2.4 parts of a PVC powder, which had been produced by spray dyring an emulsion PVC latex similar to the one used in Example 1.

The amount of calcium chloride was doubled to 0.2 parts. In this instance a product characterized by a uniform grain size was also obtained, which had a plasticizer absorption of 30 percent. The bulk density amounted to 0.45. The product had an excellent free-flowing quality. Under microscopic examination, this polymer was observed to have a uniform internal structure and appeared to be composed of small particles having a diameter of 1 to 3 microns.

EXAMPLE 3

| | |
|---|---|
| 575 | parts of water, |
| 30 | parts of a 1% aqueous solution of methyl cellulose, |
| 25 | parts of an emulsion PVC latex (K value 60, solids content 41.5%, average particle size 0.4 microns), |

| | |
|---|---|
| 3.0 | parts of lauroylperoxide, and |
| 0.375 | parts of CaCl₂ | were introduced into a one cubic meter autoclave provided with stirrer. A vacuum was then established in the autoclave and 250 parts of vinyl chloride were introduced therein. The polymerization was carried out at 66°C and 150 rpm. After 7 hours the reaction had ended.

The PVC which was recovered had a sieve analysis of 90 percent between 100 and 120 microns, a bulk density of 0.435, and a plasticizer absorption of 35 percent.

EXAMPLE 4

Example 3 was repeated with the same materials and using similar quantities, but using an emulsion PVC latex having a K value of 70 in place of the PVC latex of Example 3. The polymerization was carried at 53°C and continued until a pressure drop occurred.

The product had a K value of 70. The product which was obtained had the same sieve analysis as that set out in Example 3 and had a pore volume of 50 percent by volume. The plasticizer absorption amounted to 43 percent.

When in place of the methyl cellulose, the same amount of polyvinyl alcohol was used (prepared from polyvinyl acetate having a molecular weight of 50–80 by saponification, degree of saponification 80–90 percent), similar results were obtained.

EXAMPLE 5

Example 3 was repeated, but in this instance an emulsion PVC latex whose K value amounted to 60 and whose average particle size amounted to (a) 0.25 and (b) 0.5 micron was employed. The polymerization temperature was 65°C and in place of the calcium chloride, 0.5 parts of magnesium chloride . 6 H₂O was used. The polymer which was recovered has the same properties as set out in Example 3. The same results were obtained when azo-bis-isobutyronitrile was used as the catalyst instead of lauroyl peroxide, in quantities of 0.1 to 0.3 percent referred to the monomeric vinyl chloride.

I claim:

1. Process for the preparation of polyvinylchloride comprising polymerizing vinylchloride in suspension in an aqueous medium by contacting such under suspension polymerization conditions with a polymerization catalyst selected from the group consisting of peroxide and azo compounds, a protective colloid and an emulsion of polyvinylchloride containing emulsifier, which polyvinylchloride is present in a proportion of 1 to 20 weight percent referred to the vinylchloride monomer, and has a particle size of 0.03 to 2.0 $\mu$; introducing a salt of a polyvalent metal thereinto; precipitating the emulsifier introduced with said polyvinylchloride emulsion by said salt; and thereafter recovering the vinylchloride polymer thus formed.

2. Process according to claim 1 wherein said polyvinylchloride is present in an amount of 3 to 8 weight percent referred to the vinylchloride monomer and said polymerization is carried out at 30° to 80°C.

3. Process according to claim 1 wherein said polyvinylchloride has a particle size of 0.3 to 0.5 $\mu$.

4. Process according to claim 1 wherein said polyvinylchloride is in the form of a latex.

5. Process according to claim 4 wherein said latex has a solids content of between 20 and 60 percent by weight.

6. Process according to claim 1 wherein said catalyst is a member selected from the group consisting of lauroyl peroxide, caproyl peroxide, benzoyl peroxide, keto peroxide, persulfates, and azoisobutyric acid.

7. Process according to claim 1 wherein said protective colloid is a member selected from the group consisting of methyl cellulose, gelatin water-soluble starches, polyvinyl alcohols, polyacrylic acid, talc and kaolin.

8. Process according to claim 1 wherein said salt is a member selected from the group consisting of chlorides, sulfates, nitrates and acetates of calcium, magnesium, aluminum, strontium, barium, tin and zinc.

9. Process according to claim 1 wherein there is additionally present a monomer selected from the group consisting of vinyl acetate, vinylidene chloride, vinyl ether, acrylonitrile, acrylic acid ester and methacrylic acid ester in an amount of up to 10 percent by weight of total monomer present.

* * * * *

PO-1050
(5/69)

UNITED STATES PATENT OFFICE
CERTIFICATE OF CORRECTION

Patent No. 3,697,493      Dated October 10, 1972

Inventor(s) GUNTHER MEYER

It is certified that error appears in the above-identified patent and that said Letters Patent are hereby corrected as shown below:

Title Page, line 6 of Abstract, before "including" insert --emulsion--

Column 2, line 7, "onthe" should be --on the--

Signed and sealed this 20th day of November 1973.

(SEAL)
Attest:

EDWARD M. FLETCHER, JR.
Attesting Officer

RENE D. TEGTMEYER
Acting Commissioner of Patents